(12) United States Patent
Cachod

(10) Patent No.: US 7,556,269 B2
(45) Date of Patent: Jul. 7, 2009

(54) TOOL-CARRIER CHUCK FOR ROTATING MACHINE, FURNISHED WITH LOCKING MEANS

(75) Inventor: Yves Cachod, Levier (FR)

(73) Assignee: Etablissements Amyot S.A., Pontarlier (FR)

( * ) Notice: Subject to any disclaimer, the term of this patent is extended or adjusted under 35 U.S.C. 154(b) by 364 days.

(21) Appl. No.: 11/362,785

(22) Filed: Feb. 28, 2006

(65) Prior Publication Data

US 2007/0252345 A1 Nov. 1, 2007

(51) Int. Cl.
B23B 31/163 (2006.01)
(52) U.S. Cl. .................................... 279/63; 279/140
(58) Field of Classification Search ............... 279/9.1, 279/60, 63, 140; B23B 31/163
See application file for complete search history.

(56) References Cited

U.S. PATENT DOCUMENTS

| 573,189 | A | * | 12/1896 | Vogel | 279/62 |
|---|---|---|---|---|---|
| 4,213,623 | A | * | 7/1980 | Rohm | 279/140 |
| 4,302,021 | A | | 11/1981 | Roehm et al. | |
| 5,031,925 | A | | 7/1991 | Tasu et al. | |
| 5,232,230 | A | | 8/1993 | Lin | |
| 5,375,858 | A | * | 12/1994 | Rohm | 279/63 |
| 5,458,345 | A | * | 10/1995 | Amyot | 279/62 |
| 5,741,016 | A | * | 4/1998 | Barton et al. | 279/62 |
| 6,007,071 | A | | 12/1999 | Middleton et al. | |
| 6,550,785 | B2 | * | 4/2003 | Rohm | 279/62 |
| 6,659,474 | B2 | * | 12/2003 | Sakamaki et al. | 279/62 |
| 7,125,021 | B2 | * | 10/2006 | Tan | 279/62 |
| 7,185,895 | B2 | * | 3/2007 | Cachod et al. | 279/62 |
| 7,258,351 | B2 | * | 8/2007 | Hoffmann et al. | 279/60 |
| 7,431,308 | B2 | * | 10/2008 | Cachod | 279/62 |
| 7,503,565 | B2 | * | 3/2009 | Rohm | 279/60 |
| 2003/0141676 | A1 | | 7/2003 | Sakamaki et al. | |
| 2004/0135325 | A1 | * | 7/2004 | Cachod et al. | 279/62 |
| 2004/0217558 | A1 | | 11/2004 | Yang et al. | |
| 2004/0227309 | A1 | | 11/2004 | Rohm | |
| 2008/0217869 | A1 | * | 9/2008 | Mack | 279/62 |
| 2009/0058019 | A1 | * | 3/2009 | Mack | 279/114 |

FOREIGN PATENT DOCUMENTS

| DE | 3713457 C1 | * | 9/1988 |
|---|---|---|---|
| EP | 0 335 593 A | | 10/1989 |
| EP | 0 590 754 A | | 4/1994 |
| EP | 0 864 390 A | | 9/1999 |
| EP | 1 314 499 A | | 5/2003 |

* cited by examiner

Primary Examiner—David P Bryant
Assistant Examiner—Eric A Gates
(74) Attorney, Agent, or Firm—Oliff & Berridge, PLC

(57) ABSTRACT

The chuck comprises a central part associated with jaws and furnished with peripheral gear teeth, a rotating part movable in rotation about the central part, and a clamping ring movable in rotation about the rotating part by a limited angular amount.

The rotating part has an opening situated opposite the peripheral gear teeth and in which a locking finger is engaged which, actuated by the clamping ring, may pivot in a plane transverse to the chuck, while being guided by the walls of the opening.

In the unlocked position, the finger is at a distance from the gear teeth, but, in the locked position, the finger is engaged in the gear teeth and allows the central part to rotate only to the right.

8 Claims, 5 Drawing Sheets

TOOL-CARRIER CHUCK FOR ROTATING MACHINE, FURNISHED WITH LOCKING MEANS

BACKGROUND OF THE INVENTION

The present invention relates to a tool-carrier chuck for fitting to a rotating machine furnished with locking means.

A chuck mounted on the shaft of a rotating machine aims to achieve the attachment of a tool, such as a bit if it is a drilling tool. The tool is routinely attached to the chuck by means of three forward-converging jaws, operated and guided by different means made in the chuck, so that the forward axial movement of the jaws translates into their coming closer together in order to clamp the tool, while the rearward movement of the jaws is accompanied by an unclamping of the tool.

A chuck of the aforementioned type is usually fitted with a central part which has, on the one hand, a rear portion intended to be attached to the rotating machine and, on the other hand, a front portion with which the jaws are associated and which is surrounded by a clamping ring.

By rotating the clamping ring, a user may actuate the chuck. Accordingly, the jaws have an externally threaded portion that may be rotated by a peripheral nut that is operated by the clamping ring. The rotation of the clamping ring relative to the central part leads to the clamping or unclamping of the jaws depending on the direction of rotation.

DESCRIPTION OF THE PRIOR ART

Now, during the use of the rotating machine, the vibrations and/or forces exerted on the tool may lead to the unclamping of the latter. There are locking systems that make it possible to prevent an unclamping of the tool. But such systems, although they make it possible to prevent the unclamping of the jaws under the effect of the vibrations generated during the percussion work, in no circumstances make it possible to withstand a major unclamping torque. In addition, the known systems consist of many small parts whose relative positioning and attachment are tricky to achieve and they are relatively fragile.

Also known are chucks of the self-clamping type, in which the central part has a threaded front portion. These chucks comprise a body surrounding the central part, in which are made forward-converging housings, and jaws mounted and guided in translation in these housings. The jaws include teeth on their inner face, interacting with the thread of the central part to move them between the clamped position and the unclamped position and to rotate the tool. The clamping ring is mounted about the body in order to be able to pivot relative to the latter.

Self-clamping chucks have many advantages in terms of simplicity of use and clamping power. Nevertheless, a major problem penalizes them; it is the impossibility of using them in left hand rotation (the central part of the self-clamping chuck having a right hand thread), because they then open virtually instantaneously due to their very structure.

Such chucks are therefore not suitable for use on a screwing/unscrewing-type machine. Furthermore, when used on a machine of the drilling/perforating type, these chucks do not make it easy to remove the bit from the wall to be drilled by making the shaft of the machine rotate towards the left.

There are locking systems, actuated directly at the end of the movement to close the chuck, which make it possible to prevent an unclamping of the tool during a left hand rotation. But, there again, the known systems, which use springs, do not in any circumstances make it possible to withstand a major unclamping torque. Specifically, a spring may withstand the unclamping of a chuck due to a vibration, for example during percussion operations, but not a major unclamping torque. In addition, their robustness and ease of use are not optimal.

SUMMARY OF THE INVENTION

The object of the invention is therefore to provide a chuck furnished with a simple and robust locking system, actuated automatically at the end of closure of the jaws, which makes it possible to withstand the opening torque of a chuck, and particularly of a chuck of the self-clamping type working in left hand rotation.

Consequently, the invention relates to a tool-carrier chuck for fitting to a rotating machine, comprising:
  a central part having an axis and comprising a rear portion intended to be fastened to a driveshaft of the rotating machine, peripheral gear teeth and a front portion with which jaws are associated, said jaws being able to be moved relative to the central part between a clamped position of the tool and an unclamped position;
  a rotating part mounted so that it can rotate about the central part;
  a clamping ring mounted so that it can rotate about the rotating part by a limited angular amount and allowing the jaws to move between the clamped position and the unclamped position.

According to a general definition of the invention, the rotating part has an opening situated opposite the peripheral gear teeth of the central part, and in which a locking finger is engaged, the locking finger comprising an immobilizing portion protruding from the opening inside the rotating part towards the central part and an actuation portion extending substantially perpendicular to the immobilizing portion and placed between the rotating part and the clamping ring, and the clamping ring comprises actuation means capable of interacting with the actuation portion of the locking finger to cause said locking finger to pivot in a plane transverse to the chuck and being guided by the walls of the opening, between:
  a locked position, in which the immobilizing portion of the locking finger interacts with the peripheral gear teeth of the central part, in order to allow the central part to rotate relative to the clamping ring in a first direction, corresponding to the clamping of the jaws, and to prevent this rotary movement in a second direction, corresponding to the unclamping of the jaws;
  and an unlocked position, in which the locking finger does not interact with the central part, the rotary movements of the central part relative to the clamping ring being possible in both directions.

According to a possible embodiment, the actuation portion of the locking finger comprises a locking housing and an unlocking housing radially separated from one another and each having an opening turned towards the clamping ring, and the clamping ring comprises a locking lug and an unlocking lug protruding inwards and radially separated from one another by a distance greater than the radial separation between the locking housing and unlocking housing of the finger, the clamping ring being capable of being rotated relative to the rotating part between the locked position, in which the locking lug interacts with the locking housing, and the unlocked position, in which the locking lug interacts with the unlocking housing.

The immobilizing portion of the locking finger may have, in the vicinity of the opening of the rotating part, and relative to the first direction of rotation of the central part, a curved upstream face and a convex downstream face, the pivoting of the locking finger in a plane transverse to the chuck about a wall of the opening taking place about a imaginary axis situated in the reinforcement formed by the curved upstream face. As a result, the pivoting of the locking finger relative to the rotating part is made easier.

It should be noted that the locking finger, once actuated in its locked position, braces itself between the gear teeth of the central part and the rotating part, when an unclamping action is exerted, so that it is the finger that takes all the forces, and not the actuation elements. There is therefore no risk of accidental unclamping, as in the case of a locking device using elastic elements.

To understand it fully, the invention is again described below with reference to the appended figures representing, as a nonlimiting example, a possible embodiment of the chuck.

DESCRIPTION OF THE PREFERRED EMBODIMENT

Figure 1:
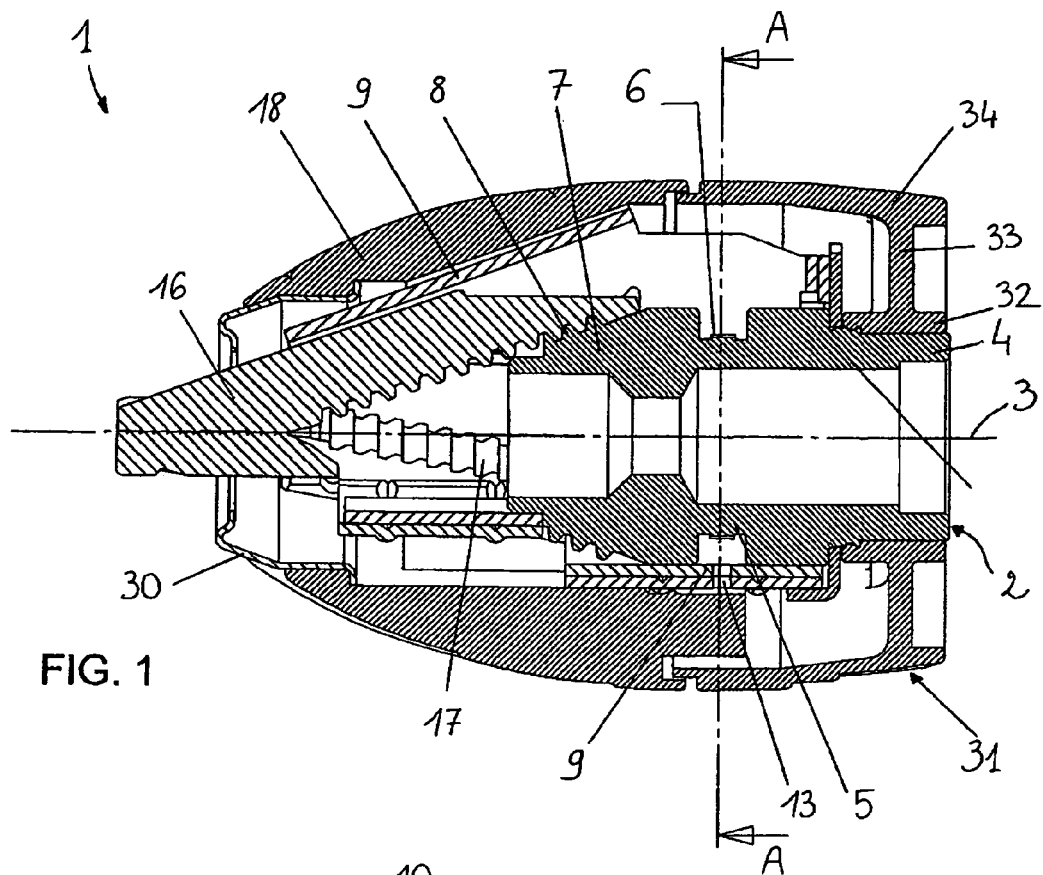
FIG. 1 is a view in longitudinal section of a chuck according to the invention.
Figure 2:
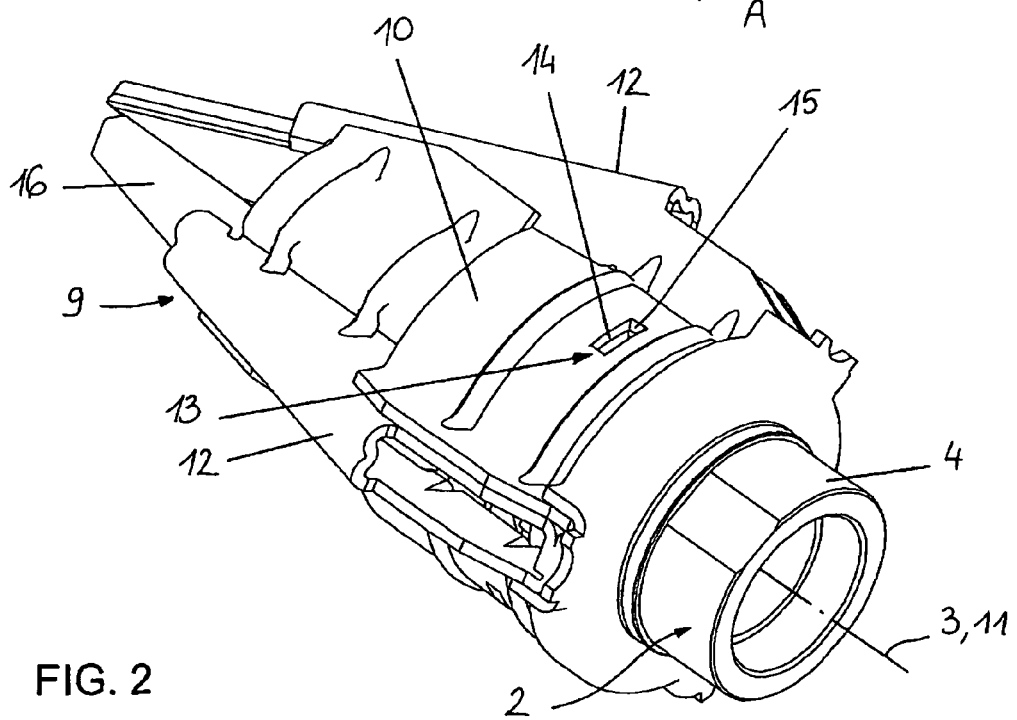
FIG. 2 is a view in perspective of the body of the chuck placed about the central part.
Figure 3:
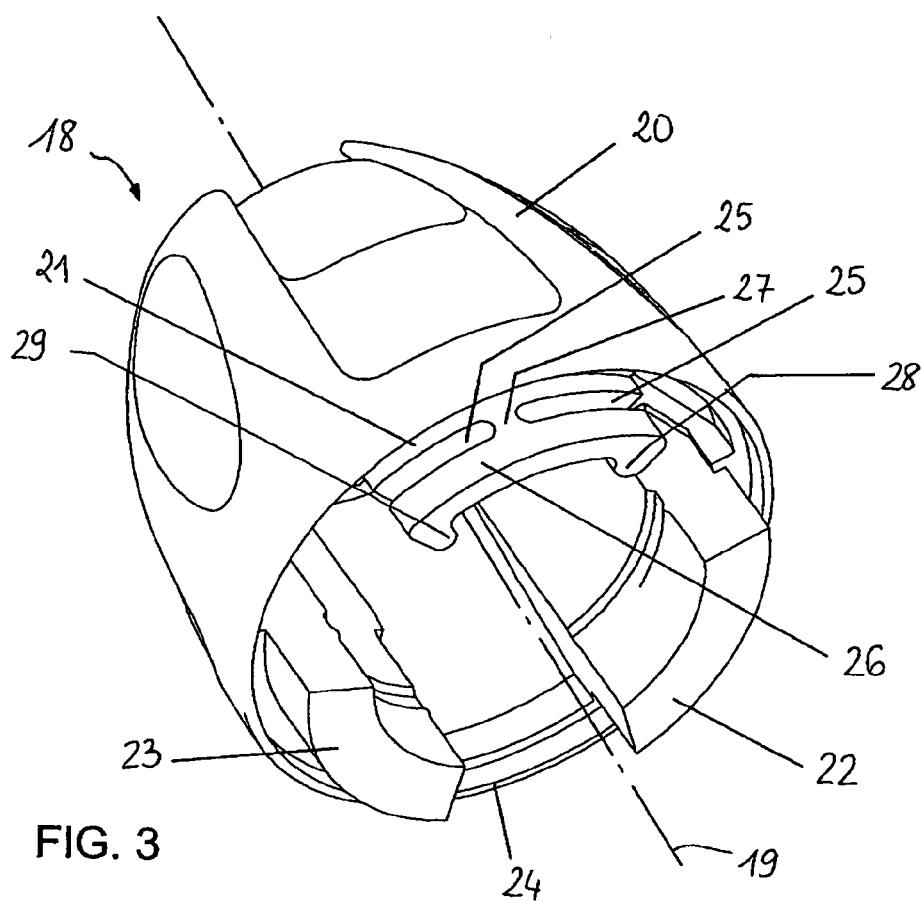
FIG. 3 is a view in perspective of the clamping ring.
Figure 4:
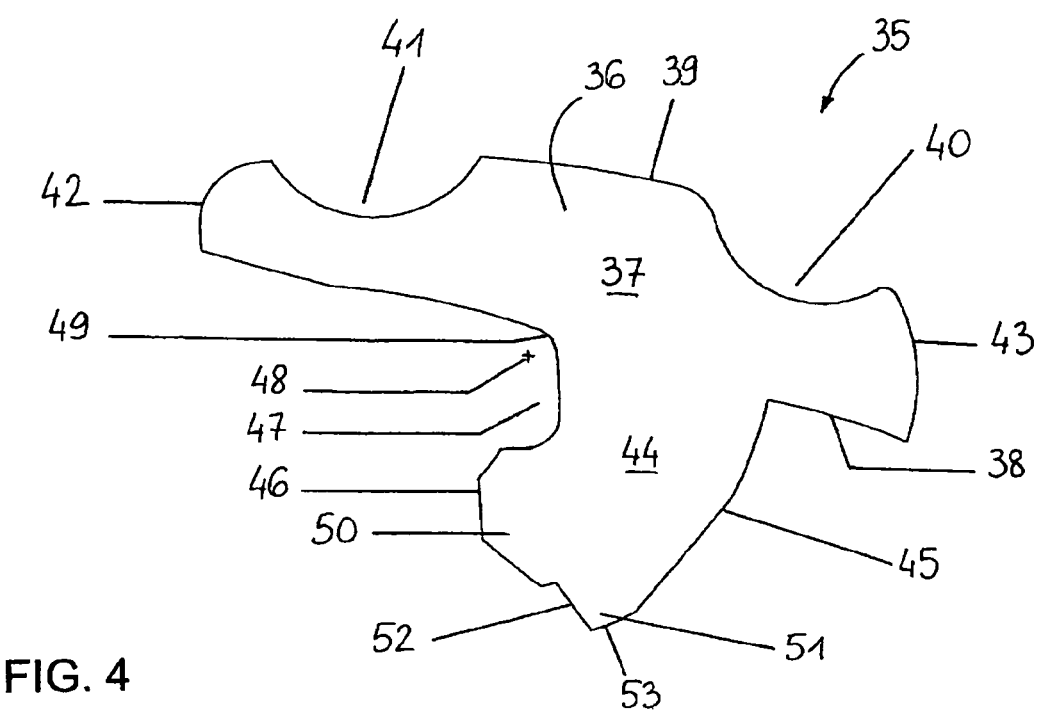
FIG. 4 is a view in elevation of the locking finger.
Figure 5:
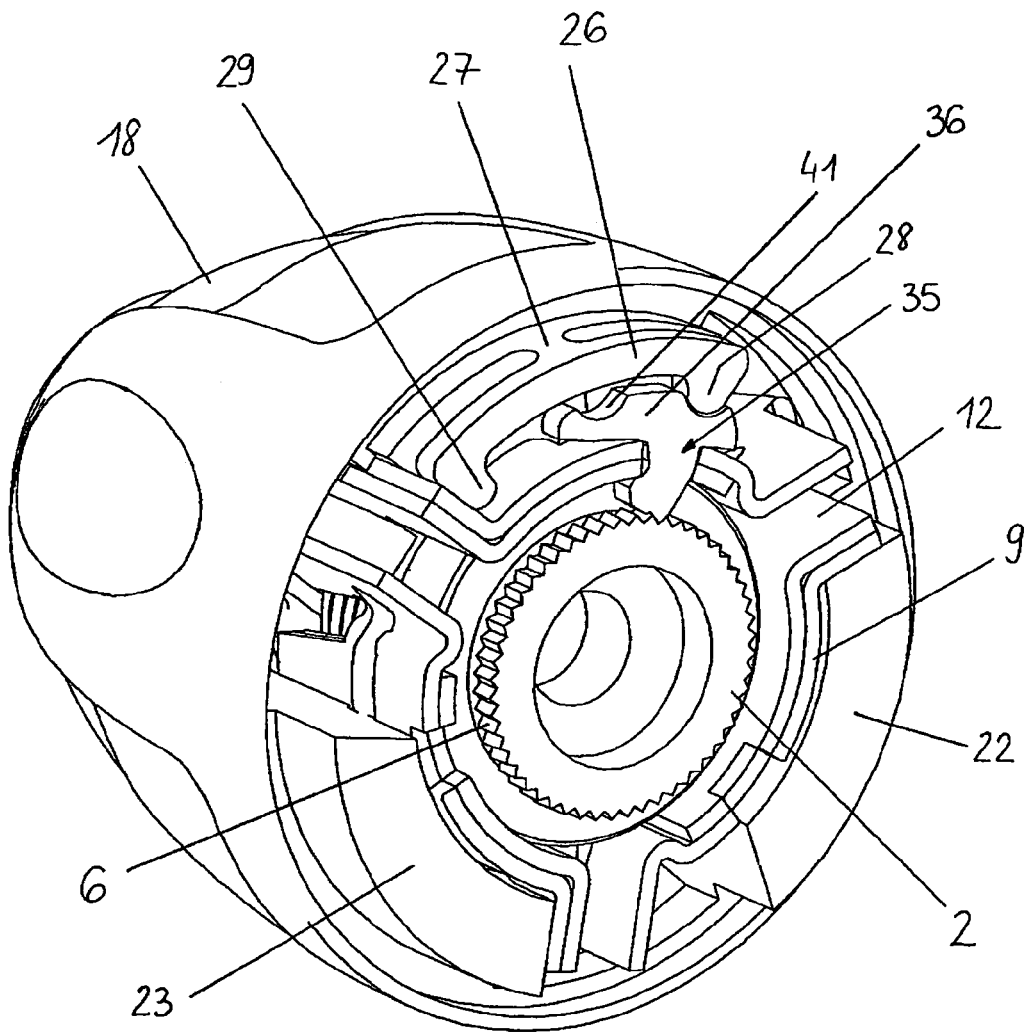
FIG. 5 is a view in perspective showing the inside of the chuck of FIG. 1, in cross section along the line AA, in the locked position.

The chuck 1 first of all comprises a central part 2, with its axis 3, comprising a rear portion 4 intended to be attached to a driveshaft of the rotating machine, a central portion 5 having axially oriented peripheral gear teeth 6, and a front portion 7 having a forward-converging frustoconical shape furnished with a right hand external thread 8.

Figure 6:
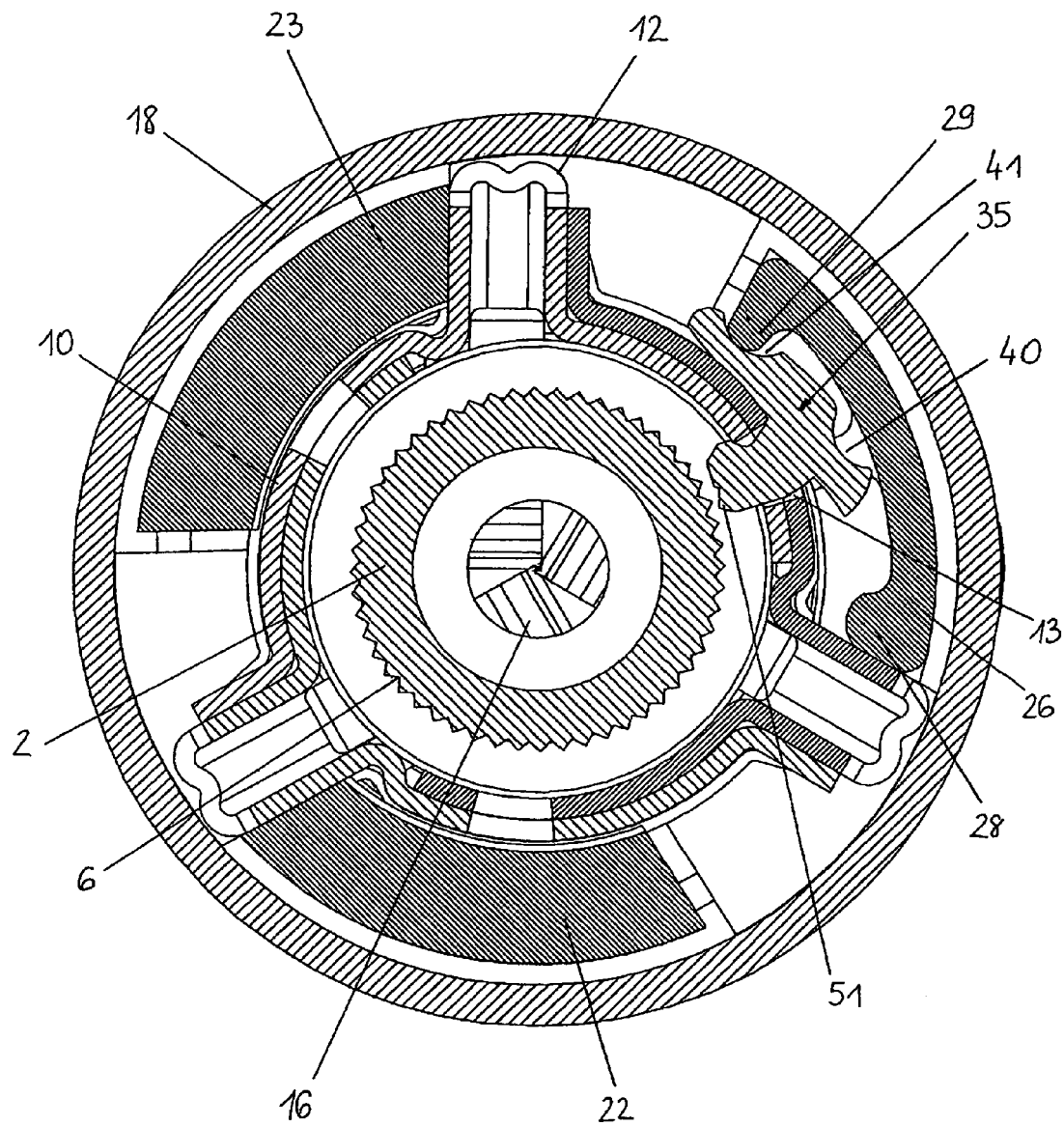
FIGS. 6 and 7 are sectional views, along the line AA, of the chuck of FIG. 1, respectively in the unlocked position and locked position.
Figure 7:
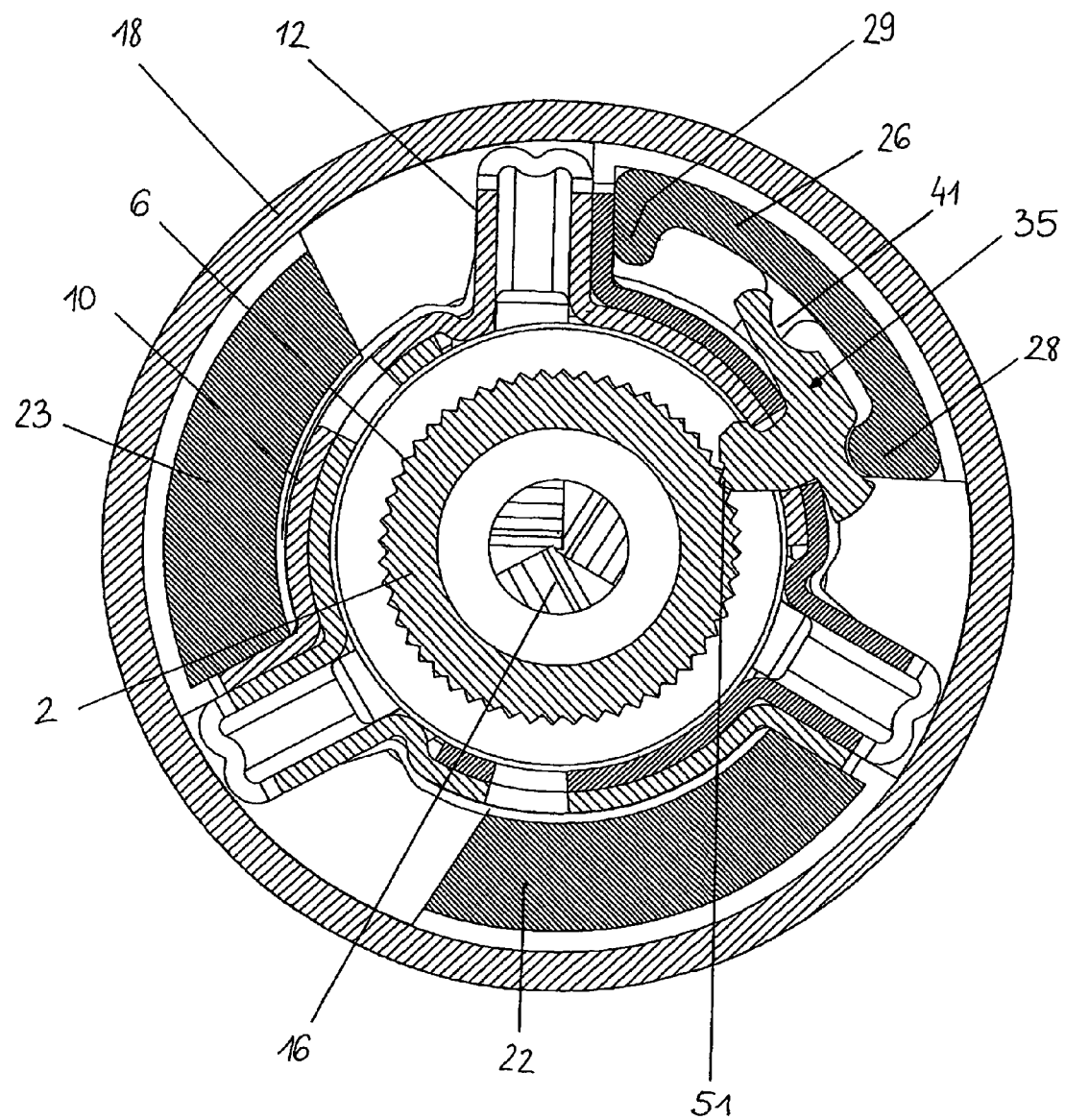

The chuck 1 also comprises a body 9 surrounding the central part 2 and mounted so that it can rotate relative to the central part 2. The body has a substantially cylindrical envelope 10, with its axis 11, from which protrude generally radially three housings 12 converging towards the front and substantially evenly spaced on the periphery. In addition, an opening 13 is made in the envelope 10 of the body 9, approximately at a third of the radial distance between two adjacent housings 12. The opening 13 is situated opposite the peripheral gear teeth 6 of the central part 2, when the body 9 is mounted on the central part 2, and is delimited by a front wall 14 and a rear wall at right angles to the axis 11 of the envelope 10 and two side walls 15 perpendicular to the front wall 14 and rear wall. Although other embodiments may be envisaged, the body 9 is here formed from a metal sheet comprising three wings folded on themselves, represented with different hatching in the cross-sectional views (FIGS. 6 and 7).

The chuck 1 also comprises jaws 16, each being mounted and guided in translation in a housing 12 of the body 9. Each jaw 16 comprises teeth 17 on its inner face, intended to interact with the thread 8 of the central part 2.

A clamping ring 18, with its axis 19, is mounted substantially coaxially about the body 9 in the front portion of the chuck 1. The clamping ring 18 comprises an envelope 20 in the shape of a dome open towards the rear, whose internal diameter is slightly greater than the external diameter of the housings 12 all along the axis, so that the body 9 fits perfectly into the clamping ring 18.

Inside the envelope 20, close to its inner face and made of the same material as it, the clamping ring 18 comprises three members 21, 22, 23 having in section a shape of a portion of a crown coaxial with the envelope 20. The members 21, 22, 23 are substantially equally distributed on the inner periphery of the envelope 20 and protrude axially rearwards beyond the rear edge 24 of the envelope 20.

The members 21, 22, 23 have a radial thickness less than the radial distance between the inner face of the envelope 20 of the clamping ring 18 and the outer face of the envelope 10 of the body 9, in the mounted state, and a circumferential length of less than the circumferential space between two housings 12 of the body 9. For example, each member 21, 22, 23 extends over an arc of a circle of approximately 60 to 80°. Thus, in the mounted state about the body 9, the clamping ring 18 may pivot about the body 9 by a limited angular amount, each member 21, 22, 23 rotating between two extreme positions defined by the abutment against a housing 12. The amount of this movement is for example of the order of 20 to 40°.

One of the three members 21 comprises two annular grooves 25 each made from a circumferential end of the member 21, substantially on one and the same arc of a circle and at right angles to the rear edge 24 of the envelope 20, over a distance of less than half the circumferential length of the member 21. Thus, the rear portion of the member 21 forms a protrusion 26 in the shape of a portion of a crown, connected to the envelope 20 by a bridge 27 of material. In addition, the protrusion 26 has a cutout made from its inner face, substantially centered circumferentially, so that the protrusion 26 has, at its circumferential end portions, two lugs, respectively a locking lug 28 and an unlocking lug 29. The locking lug 28 has a circumferential length that is greater than the unlocking lug 29.

Due to its reduced axial length and its being attached to the envelope 20 only by the bridge 27, the protrusion 26 may be deformed elastically in a transverse plane (at right angles to the axis of the chuck) in order to move the lugs 28, 29 closer to or further away from one another. Furthermore, the contour of the lugs 28, 29 is rounded in order to make it easier for them to move and slide along various surfaces, as will be seen hereinafter.

A metal snout 30 is also mounted inside the clamping ring 18. The snout 30 partly protrudes at the front of the chuck 1 and is furnished with a central opening allowing the jaws 16 and the tool to pass through.

The chuck 1 also comprises a rear ring 31 engaged substantially coaxially about the rear portion 4 of the central part 2. The rear ring 31 and the clamping ring 18 are substantially adjacent and of the same diameter in their zone of adjacence, the chuck 1 thus having a substantially continuous side envelope. The rear ring 31 comprises a cylindrical portion 32 engaged on the rear portion 4 of the central part 2, extended rearwards by a ring-shaped radial portion 33, itself extended outwards by a substantially cylindrical skirt 34. The rear portion 4 of the central part 2 and the cylindrical portion 32 of the rear ring comprise reciprocal means of immobilization in rotation and in axial translation.

Finally, the chuck 1 comprises a locking finger 35 provided so as to be engaged in the opening 13 of the body 9. The locking finger 35 is formed from a metal plate by punching or die-stamping, and comprises a front face and a rear face 36, that are substantially flat and parallel, spaced from one another by a distance substantially equal to the distance between the front wall 14 and rear wall of the opening 13. Thus, when the finger 35 is placed in the opening 13, its front and rear faces 36 interact with the front wall 14 and rear wall of the opening 13 which ensures that the finger 35 is well held in a plane transverse to the axis of the chuck 1.

The locking finger 35, comprises an elongated actuation portion 37 whose inner face 38 is substantially flat and whose outer face 39, globally parallel to the inner face 38, comprises two cutouts in the shape of a portion of disk, one of them forming a locking housing 40 and the other an unlocking housing 41. The housings 40, 41 are spaced from one another in a direction parallel to the front and rear faces of the ring 35 at a distance of less than the circumferential distance between the unlocking lug 29 and the locking lug 28.

To simplify the description, the terms "upstream" and- "downstream" will be used, each identifying one side of the locking finger 35, when it is seen from its rear face 36, respectively the side of the unlocking housing 41 and the side of the locking housing 40.

The upstream face 42 and the downstream face 43 of the actuation portion 37 of the locking finger 35 are convex and define sliding ramps for the locking lug 28 and unlocking lug 29 as will be seen hereinafter.

The locking finger 35 also comprises an immobilizing portion 44 protruding substantially perpendicularly from the inner face 38 of the actuation portion 37, in a manner non-centered but offset downstream. The immobilizing portion 44 comprises a convex downstream face 45 forming a sliding skid, situated substantially at right angles to the locking housing 40. The upstream face 46 comprises a first curved portion forming a reinforcement 47 in which is situated the imaginary axis 48 of the connecting fillet 49 like a portion of a cylinder between the upstream face 46 of the immobilizing portion 44 and the inner face 38 of the actuation portion 37. The upstream face 46 then has a convex portion formed by a shoe 50 protruding upstream substantially parallel to the actuation portion 37 and at least partly opposite the latter. The immobilizing portion 44 thus substantially has the shape of a hook curved in the upstream direction.

Finally, the free end portion of the immobilizing portion 44 has the form of a tooth 51 comprising upstream an exit face 52 and downstream an immobilizing face 53.

When the chuck 1 is mounted, the immobilizing portion 44 of the locking finger 35 is engaged in the opening 13 of the body 9, the inner face 38 of the actuation portion 37 coming into contact with the outer face of the envelope 10 of the body 9. Then the clamping ring 18 is engaged about the body 9 and the locking finger 35, so that the protrusion 26 is situated between the same two housings 12 as the locking finger 35.

The operation of the chuck 1 is as follows.

Initially, the various component elements of the chuck 1 are in the position of FIG. 6, that is the unlocked position, in which the unlocking lug 29 is placed in the unlocking housing 41, the locking finger 35 not being in contact with the peripheral gear teeth 6 of the central part 2. The locking lug 28 is then butting against the housing 12 situated downstream of the locking finger 35.

To move the jaws 16 towards the tool clamping position, the clamping ring 18 is rotated relative to the central part 2 in the anticlockwise direction (as in the FIG. 6 view). The unlocking lug 29 remains placed in the unlocking housing 41 and consequently rotates the body 9 about the central part 2 via the locking finger 35. Since the locking finger 35 is still not in contact with the peripheral gear teeth 6, it does not prevent the relative rotation of the clamping ring 18-body 9 assembly relative to the central part 2. The jaws 16, due to the interaction between their teeth 17 and the thread 8 of the central part 2, are moved in the housing 12 of the body 9 towards the front of the chuck 1 and brought closer to one another.

When the jaws 16 make contact with the tool to be clamped, the resistance of the body 9 against the rotation by the clamping ring 18 increases. As a result, when the rotary movement continues, the unlocking lug 29 exits the unlocking housing 41 and the locking lug 28 moves closer to the downstream face 43 of the actuation portion 37 of the locking finger 35 against which it slides before placing itself in the locking housing 40 causing the locking finger 35 to pivot about the imaginary axis 48. This movement of the locking lug 28 is made possible by the elasticity of the protrusion 26 as explained hereinabove.

In this position, called the locked position (FIG. 7), the unlocking lug 29 butts against the housing 12 situated upstream of the locking finger 35, and the tooth 51 is engaged in the peripheral gear teeth 6 of the central part 2.

When the central part 2 is rotated in the clockwise direction ("right hand rotation"), the chuck 1 has a natural tendency to tighten. The peripheral gear teeth 6 of the central part 2 push on the exit face 52 of the tooth 51 in a direction substantially at right angles to this face. By their structure, the connecting fillet 49 and the sliding skid 45 allow the locking finger 35 to pivot relative to the body 9, in a transverse plane, centered on the imaginary axis 48. This pivoting motion is also made possible by the relative dimensions of the opening 13 and the immobilizing portion 44 of the locking finger 35.

The locking finger 35 may therefore pivot in the anticlockwise direction, this movement being limited by the locking lug 28 connected to the elastically deformable protrusion 26. It follows that the locking finger 35 is operated in an alternating pivoting movement in a transverse plane, like a pawl of a ratchet wheel system and generates a characteristic clicking sound.

Conversely, if the central part 2 is rotated in the anticlockwise direction ("left hand rotation"), the chuck 1 has a natural tendency to slacken. The peripheral gear teeth 6 of the central part 2 push on the immobilizing face 53 of the tooth 51 in a direction substantially at right angles to this face. Consequently, the locking finger 35 is forced to pivot in the clockwise direction towards an immobilizing position in which the shoe 50 is pressed against the inner face of the body 9. Consequently, the central part 2-locking finger 35-body 9-clamping ring 18 assembly is made integral in rotation, in the anticlockwise direction, which prevents the jaws 16 from slackening.

To unlock and open the chuck 1, it is sufficient to rotate the clamping ring 18 in the clockwise direction, relative to the central part 2, from the locked position to the unlocked position.

During this movement, the locking lug 28 leaves the locking housing 40, then the unlocking lug takes position in the unlocking housing 41, causing the locking finger 35 to pivot about the imaginary axis 48, the tooth 51 therefore parting contact with the peripheral gear teeth 6 of the central part 2. The clamping ring 18 may then freely rotate the body 9 in the clockwise direction, the jaws 16 being moved towards the unclamped position where they are retracted to the inside of the chuck 1 and separated from one another, the tool then being able to be removed from the chuck 1.

It goes without saying that the invention is not limited to the embodiment described hereinabove as an example, but that, on the contrary, it embraces all the variant embodiments. The invention may particularly be applied in chucks in which the jaws are operated by a peripheral nut.

What is claimed is:

1. A tool-carrier chuck for fitting to a rotating machine, comprising:
    a central part comprising a rear portion intended to be fastened to a driveshaft of the rotating machine, peripheral gear teeth and a front portion with which jaws are associated, said jaws being able to be moved relative to the central part between a clamped position and an unclamped position;
    a rotating part mounted so that it can rotate about the central part;
    a clamping ring mounted so that it can rotate about the rotating part by a limited angular amount and allowing the jaws to move between the clamped position and the unclamped position;
    wherein the rotating part has an opening defined by walls situated opposite the peripheral gear teeth of the central part, and in which a locking finger is engaged, the locking finger comprising an immobilizing portion protruding from the opening inside the rotating part towards the central part and an actuation portion extending substantially perpendicular to the immobilizing portion and placed between the rotating part and the clamping ring, and wherein the clamping ring comprises actuation means capable of interacting with the actuation portion of the locking finger to cause said locking finger to pivot in a plane transverse to the chuck and being guided by the walls of the opening, between:
    a locked position, in which the immobilizing portion of the locking finger interacts with the peripheral gear teeth of the central part, in order to allow the central part to rotate relative to the clamping ring in a first direction, corresponding to the clamping of the jaws, and to prevent this rotary movement in a second direction, corresponding to the unclamping of the jaws;
    and an unlocked position, in which the locking finger does not interact with the central part, the rotary movements of the central part relative to the clamping ring being possible in both directions,
    wherein the actuation portion of the locking finger comprises a locking housing and an unlocking housing radially separated from one another and each having an opening turned towards the clamping ring, and in that the clamping ring comprises a locking lug and an unlocking lug protruding inwards and radially separated from one another by a distance greater than the radial separation between the locking housing and unlocking housing of the finger, the clamping ring being capable of being rotated relative to the rotating part between the locked position, in which the locking lug interacts with the locking housing, and the unlocked position, in which the unlocking lug interacts with the unlocking housing.

2. The chuck as claimed in claim 1, wherein the immobilizing portion of the locking finger has, in the vicinity of the opening of the rotating part, and relative to the first direction of rotation of the central part, a curved upstream face and a convex downstream face, the pivoting of the locking finger in a plane transverse to the chuck about a wall of the opening taking place about a imaginary axis situated in a reinforcement formed by the curved upstream face.

3. The chuck as claimed in claim 2 wherein, in the locked position, and when the central part is operated in a rotary movement in the second direction, the locking finger is forced by the gear teeth of the central part towards an immobilizing position in which a shoe is pressed against an inner face of the rotating part, the central part, locking finger, rotating part and the clamping ring assembly being made integral in rotation.

4. The chuck as claimed in claim 1, wherein the immobilizing portion of the locking finger comprises a shoe extending substantially parallel to the actuation portion and at least partially opposite the actuation portion, thus defining between the shoe and the actuation portion a reinforcement capable of receiving a portion of the rotating part.

5. The chuck as claimed in claim 1, wherein, in the locked position, the rotation of the central part in the first direction causes, via the gear teeth, and due to the interaction between the locking lug of the clamping ring and the locking housing of the locking finger, an alternating pivoting movement of the locking finger in a transverse plane.

6. The chuck as claimed in claim 1, wherein the opening is delimited by a front wall and a rear wall that are orthogonal to the axis of the chuck, the locking finger having a front face and a rear face that are substantially flat and parallel, intended to interact with the front wall and rear wall of the opening during the locking and unlocking of the chuck.

7. The chuck as claimed in claim 1, wherein the locking finger is formed from a metal plate by punching or die-stamping.

8. The chuck as claimed in claim 1, wherein the jaws are guided in translation in housings made in the rotating part forming a body, the jaws converging towards the front and having teeth on their inner face, and the front portion of the central part is threaded and interacts with the teeth of the jaws, so that the rotary actuation of the clamping ring relative to the central part by a user causes the rotation of the body and therefore of the jaws which, due to the interaction between their teeth and the central threaded part, are moved between the clamped position and the unclamped position.

* * * * *